(No Model.)
S. E. THOMAS.
WASTE TRAP.
No. 286,746. Patented Oct. 16, 1883.
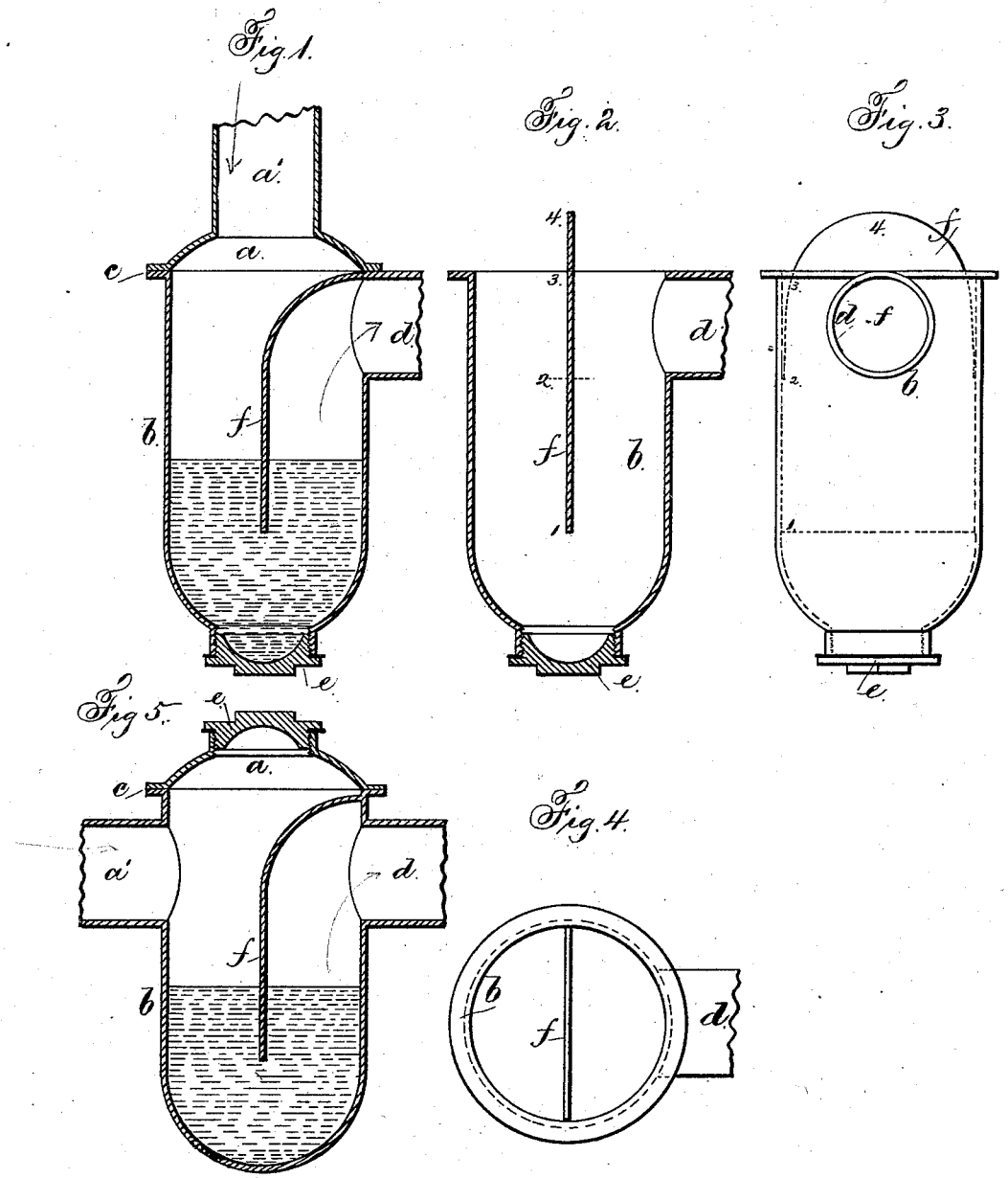

UNITED STATES PATENT OFFICE.

SAMUEL E. THOMAS, OF BROOKLYN, NEW YORK.

WASTE-TRAP.

SPECIFICATION forming part of Letters Patent No. 286,746, dated October 16, 1883.

Application filed February 12, 1883. (No model.)

*To all whom it may concern:*

Be it known that I, SAMUEL E. THOMAS, of Brooklyn, in the county of Kings and State of New York, have invented a certain new and useful Improvement in Waste-Traps; and the following is declared to be a full and exact description of the same.

In the manufacture of cast lead traps for plumbers' use great care has to be exercised to make the traps of a desirable and efficient form, and also in such a manner that the cores can be easily removed after casting, and it is desirable to have no seam in the lower part of the trap where the waste water remains, as the rough or projecting edges of this seam are liable to catch and retain particles that eventually will interfere with the proper washing of the trap; and this seam is also liable to open or separate from expansion and contraction produced by heat and cold, and become leaky.

My invention has for its object the making of a cheap, efficient, and reliable waste-trap, wherein the seam is in the upper portion, where the water does not come into contact with it, and the cup portion is of such shape that the cores can be easily and quickly removed after casting.

In my improved trap I make the lower portion, the central partition, and the exit-pipe in one casting, the upper portion being in another casting.

The central partition of the trap is the main feature of my invention. The cup portion of this trap is cast with a cross-partition, the upper portion of which is free from the side walls, and the partition extends above the top of the cup, and the end is rounded. After the partition is cast in this manner I bend the upper or free end of the partition over in a curved form until its edges touch the walls of the trap, and I solder the edges and unite them firmly with the cup and form what is called the "dam."

In the drawings, Figure 1 is a vertical section of a trap complete. Fig. 2 is a vertical section of the cup portion of the trap as cast with the vertical partition. Fig. 3 is an elevation of the same at right angles to Fig. 2.
Fig. 4 is a plan of the cup, and Fig. 5 is a vertical section of a running trap containing my improvement.

The trap is constructed of the upper portion, *a*, and bottom or cup portion, *b*. The upper portion, *a*, has the inlet-pipe *a'*, and the bottom portion is constructed with the exit-pipe *d* and cleaning-plug *e*, as usual. Sometimes the inlet-pipe *a'* is at the opposite side of the cup *b* to the pipe *d*, as seen in Fig. 5. The central partition, *f*, is of the form shown in Figs. 2, 3, and 4, the lower portion from 1 to 2 being preferably cast solid with the walls of the trap, while the upper portion, 3 4, is separated and free from the side walls and elliptical in the shape of its edges, so that this portion of the partition may be bent down into the cup *b*, and its edges will set closely against the inner surface of the cup *b*, as seen in Figs. 1 and 5, and after being so bent the parts are soldered together to form a perfect dam to exclude sewer-gas. This soldering is done with a soldering-iron or blow-pipe flame. The parts *a* and *b* are also soldered together at the seam *c* when the two parts of the trap are put together.

Fig. 5 shows a running-trap with my improved partition, as before described, bent over and sealed to form the dam of the trap. In this trap the inlet-pipe *a'* and exit-pipe *d* are at opposite sides of the cup part *b*.

Traps constructed in this way can be made with facility, because the cup *b*, pipe *d*, and partition *f* can all be cast in one piece in a metallic mold, the cores can be drawn out, and there is little risk of any defect in the dam. I prefer to cast the dam *f* with the cup *b*, as described; but it may be a separate piece soldered in. The trap-screws *e* are of ordinary character, and are at the bottom, as in Figs. 1, 2, 3, or at the top, as in Fig. 5.

I am aware that a trap with a grating at the upper end has been provided with a dam that is at an inclination to the body of such trap, and covers the lateral opening to the sewer, as in English Patent No. 1,504 of 1858. This, however, is not adapted to be placed in a line of pipe, and it could not be cast in lead in metal molds, as in my trap.

I claim as my invention—

1. In a waste-trap adapted to be inserte in a line of pipe, the combination, with the inlet-pipe $a'$ and exit-pipe $d$, of the cup $b$ and the partition $f$, the upper end of which is inclined toward the exit-pipe $d$, and united to the interior of the cup $b$ above said pipe $d$, substantially as set forth.

2. The cup portion $b$ for a waste-trap, and the partition $f$, cast together in lead or similar metal, the upper part of such partition above 2 being separate from the cup and of an elliptical shape, and adapted to be bent over against the interior of the cup and soldered to the same, substantially as set forth.

3. In a waste-trap, the combination of the cup $b$, the inlet-pipe $a'$, exit-pipe $d$, partition $f$, bent at its upper end and soldered to the inside of the cup $b$, and the upper part, $a$, soldered at $c$ to the cup $b$, substantially as specified.

Signed by me this 9th day of February, A. D. 1883.

SAMUEL E. THOMAS.

Witnesses:
GEO. T. PINCKNEY,
HAROLD SERRELL.